US007152035B1

(12) United States Patent
Suhy, Jr.

(10) Patent No.: US 7,152,035 B1
(45) Date of Patent: Dec. 19, 2006

(54) APPARATUS AND METHOD FOR TRACKING AND MANAGING PHYSICAL ASSETS

(75) Inventor: Andrew F. Suhy, Jr., Perrysburg, OH (US)

(73) Assignee: Dana Corporation, Toledo, OH (US)

( * ) Notice: Subject to any disclaimer, the term of this patent is extended or adjusted under 35 U.S.C. 154(b) by 1104 days.

(21) Appl. No.: 09/653,735

(22) Filed: Sep. 1, 2000

Related U.S. Application Data (63) Continuation-in-part of application No. 09/441,289, filed on Nov. 16, 1999, and a continuation-in-part of application No. 09/503,671, filed on Feb. 14, 2000, and a continuation-in-part of application No. 09/504,000, filed on Feb. 14, 2000, and a continuation-in-part of application No. 09/504,343, filed on Feb. 14, 2000.

(60) Provisional application No. 60/166,042, filed on Nov. 17, 1999.

(51) Int. Cl.
    *G06F 15/46* (2006.01)
(52) U.S. Cl. .......................................... 705/1
(58) Field of Classification Search ............... 705/1, 705/8, 9, 10, 28, 35
    See application file for complete search history.

(56) References Cited

U.S. PATENT DOCUMENTS

| 4,167,699 | A | * | 9/1979 | Baker ........................ 324/171 |
| 5,168,445 | A | | 12/1992 | Kawashima et al. |
| 5,875,430 | A | * | 2/1999 | Koether ........................ 705/1 |
| 6,003,808 | A | * | 12/1999 | Nguyen et al. ............. 244/1 R |
| 6,230,081 | B1 | * | 5/2001 | Albertshofer .................. 701/1 |
| 6,347,302 | B1 | | 2/2002 | Joao |
| 6,502,080 | B1 | | 12/2002 | Eichorst et al. |

OTHER PUBLICATIONS

International Search Report dated Mar. 1, 2005 (2 pages).

* cited by examiner

*Primary Examiner*—James P. Trammell
(74) *Attorney, Agent, or Firm*—Rader, Fishman & Grauer PLLC (57) ABSTRACT

A computer based system automatically gathers, analyzes, and delivers information relating to the procurement and utilization of a plurality of such assets, such as a fleet of industrial equipment, so as to maximize productivity and to reduce operating costs and administrative burdens. Each of the assets is preferably provided with a data acquisition device for sensing and storing one or more operating characteristics associated therewith. That information can be transmitted through space to a receiver connected to a local controller for storing such information and for transmitting such information to a remote analysis system. The remote analysis system automatically updates individual records associated with each of the assets with the information received. In response to such information, the remote analysis system automatically analyzes the newly provided information and generates reports regarding scheduled maintenance, warranty coverage, and other management information. These reports and newly provided information can also be transmitted for review and usage by one or more additional parties including an asset owner who sets lease rates in part based on asset usage as determined from objective criteria.

21 Claims, 7 Drawing Sheets

APPARATUS AND METHOD FOR TRACKING AND MANAGING PHYSICAL ASSETS

RELATED APPLICATIONS

This application claims the benefit of U.S. application Ser. No. 09/441,289 filed Nov. 16, 1999, U.S. Provisional Application Ser. No. 60/166,042 filed Nov. 17, 1999, U.S. application Ser. No. 09/503,671 filed Feb. 14, 2000, U.S. application Ser. No. 09/504,000 filed Feb. 14, 2000, and U.S. application Ser. No. 09/504,343 filed Feb. 14, 2000, the contents of which are all hereby incorporated in their entirety by reference.

BACKGROUND OF THE INVENTION

The present invention relates in general to systems for tracking and managing physical assets to improve productivity wherein the physical assets are subjected to a form of usage-based billing. In particular, this invention relates to a computer based system for automatically gathering, analyzing, and delivering information relating to the procurement and utilization of a plurality of such assets, such as a fleet of industrial equipment, so as to maximize productivity and to reduce the operating costs and administrative burdens associated with such assets such that it is practical to provide a form of usage-based billing that is beneficial to both the lessor and lessee.

Many businesses operate a plurality of physical assets to assist in the performance of the daily activities that are required to produce goods or services. For example, a typical manufacturer of goods often uses a fleet of industrial equipment, such as forklifts, conveyors, machine tools, and the like, in its daily operations to facilitate the manufacture of goods for its customers. In a similar manner, a typical provider of services also often employs a plurality of assets, such as computers, communications equipment, photo imaging equipment, and the like, in its daily operations to facilitate the performance of services for its customers. Traditionally, businesses have purchased such assets for use in their facilities and have employed staff to operate and maintain the assets in furtherance of the manufacture of goods or the performance of services.

Regardless of the specific nature of the business, the operation of these assets has usually been considered to be somewhat ancillary to the core nature of the business. In other words, although the use of these assets is helpful (indeed, sometimes necessary) for the business to manufacture the goods or provide the services in a cost efficient manner, the ownership, operation, and maintenance of such assets is not, of itself, a core function of the business. Consequently, the costs associated with the procurement and utilization of such assets have not been traditionally monitored or analyzed by the business in great detail. Rather, such costs have usually been considered to be relatively fixed costs of doing business, and any management of such assets has been performed, if at all, by relatively low level employees having little training or inclination to increase productivity and reduce costs.

Obviously, many businesses have been able to produce goods and provide services without actively managing the costs of obtaining and operating these assets. However, optimization of productivity and minimization of costs are key considerations in the modern business environment. Thus, it would be desirable to provide a computer based system for automatically gathering, analyzing, and delivering information relating to the procurement and utilization of a plurality of such assets, such as a fleet of industrial equipment, so as to maximize productivity and to reduce operating costs and administrative burdens associated with such assets.

It would also be desirable to be able to provide different parties having an interest in the asset ready access to up-to-date real-time and historical access to the information associated with asset usage, maintenance, performance, and the like. For example, besides the business using the asset, there is often a third party maintenance organization that helps to maintain the asset and a leasing company acting as the true asset owner that leases the asset to the business. Because the leasing company lacks appropriate information concerning the asset, the leasing arrangement typically takes this lack of information into account as part of the lease transaction, often through a combination of both a fixed lease amount tied to the asset regardless of use, as well as a financial cushion for the benefit of the true asset owner to cover unforeseen problems associated with the asset including over-use and improper maintenance.

In some situations it is known to provide a fixed flat rate rental contract that has a variable overtime provision (e.g., an asset owner charges an asset user a flat rate plus an overtime charge in excess of a maximum usage level). However, a manual recordation of the additional time is required as opposed to automatic recording.

In other situations it is known to provide billing tied to calendar usage (e.g., monthly). However, such usage does not take into account objective usage criteria such as actual hours of operation during a fixed time period.

However, if the leasing company and the business both had ready access to the same information concerning the asset, the leasing company may be willing to share an increased portion of the financial risk/reward associated with the asset's usage, maintenance, performance, and the like. With appropriate objective information it may be possible to distribute a portion of the responsibility to other responsible third parties including the asset manufacturer or supplier, and asset maintenance organization.

SUMMARY OF THE INVENTION

This invention relates to a computer based system for automatically gathering, analyzing, and delivering information relating to the procurement and utilization of a plurality of such assets, such as a fleet of industrial equipment, so as to maximize productivity and to reduce operating costs and administrative burdens. Each of the assets is preferably provided with a data acquisition device for sensing and storing one or more operating characteristics associated therewith. That information can be transmitted through space to a receiver connected to a local controller for storing such information and for transmitting such information over the Internet to a remote analysis system. The remote analysis system automatically updates individual records associated with each of the assets with the information received from the Internet. In response to such information, the remote analysis system automatically analyzes the newly provided information and generates reports regarding scheduled maintenance, warranty coverage, and other management information. These reports can be transmitted back over the Internet to an administrative controller for review by one or more persons responsible for managerial review. Additionally or alternatively, the remote analysis system can automatically post such reports on a website and, thus, be made available to one or more of such persons upon request.

Not only can the information be provided to an administrative controller, but it can be provided to third parties such as maintenance organizations, asset manufacturers or suppliers, and leasing companies. By providing up-to-date real-time and historical information concerning the asset, such third parties are willing to share the risk of the asset's usage, maintenance, and performance through creative arrangements with the asset user. A maintenance organization, for example, may be willing to enter into a fixed maintenance contract when it has the ability to readily detect adverse maintenance trends regarding an asset and is given the ability to take pro-active steps to address problems before they become major. The cost-savings associated with such a pro-active approach by an expert may be shared to the benefit of the business and the maintenance organization. Similarly, a leasing company that can reduce ownership risk through asset monitoring and appropriate asset utilization is more likely to agree to a hybrid minimum term payment and asset usage billing system or even a usage based billing system with no minimum payments.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
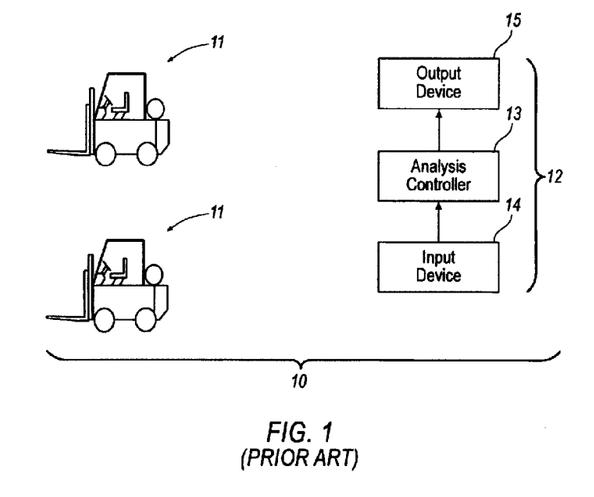
FIG. 1 is a schematic block diagram of a prior art computer based system for tracking and managing a plurality of assets.

Referring now to the drawings, there is illustrated in FIG. 1 a schematic block diagram of a prior art computer based system, indicated generally at 10, for tracking and managing a plurality of assets, several of which are indicated generally at 11. The assets 11 are illustrated as being a plurality of pieces of movable industrial equipment, such as a plurality of conventional forklifts or similar machinery, used in the manufacture of goods in a typical factory environment. However, the prior art method could be used to track and manage any type of asset 11, such as those described above, used in the manufacture of goods or the performance of services. The basic structure and operation of each of the forklifts 11 are well known in the art and, therefore, require no discussion for a complete understanding of this invention.

The prior art system 10 further included a remote analysis system, indicated generally at 12, for tracking and managing the assets 11. The remote analysis system 12 was completely separate and apart from the assets 11 and included an analysis controller 13 having one or more input devices 14 and one or more output devices 15 connected thereto. The remote analysis system 12 could be embodied as any conventional electronic controller, such as a microprocessor-based computer device. The input device 14 was embodied as a keyboard or other conventional mechanism for manually inputting data in electronic form to the analysis controller 13 for processing in the manner described below. The output device 15 was embodied as a printer or other conventional mechanism for generating a hard copy of the management information generated by the analysis controller 13 in the manner described below.

Figure 2:
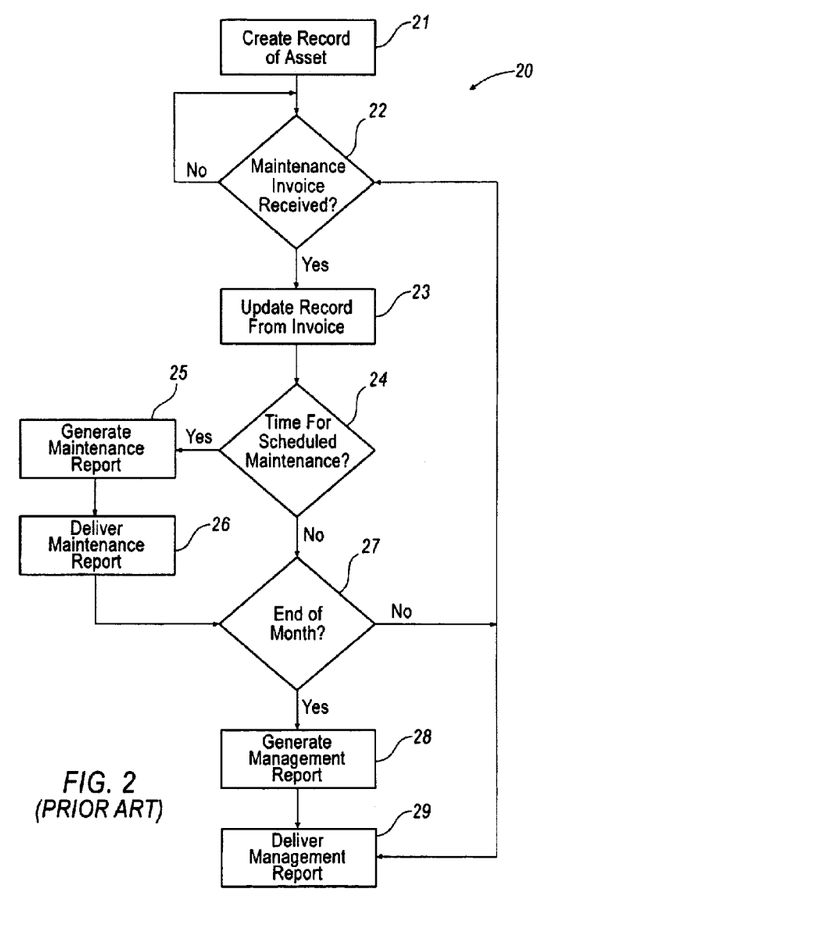
FIG. 2 is a flow chart of a prior art method for tracking and managing assets in accordance with the prior art computer based system illustrated in FIG. 1.

Referring now to FIG. 2, there is illustrated a flow chart, indicated generally at 20, of a prior art method for tracking and managing the assets 11 in accordance with the prior art computer based system 10 illustrated in FIG. 1. Throughout this discussion, reference will be made to a first person or entity that owns or operates the assets 11 that are being tracked and to a second person or entity that is responsible for tracking the management information relating to such assets 11. Notwithstanding this, it will be appreciated that a single person or entity may not only own and operate the assets 11, but also track the management information relating thereto.

In an initial step 21 of the prior art method 20, a record was created for each individual asset 11 by the person or entity responsible for tracking such assets, such as one of the forklifts 11 illustrated in FIG. 1. This record was created electronically within the analysis controller 13 by means of the input device 14 and included a variety of information that was desired to be tracked for management purposes. First, the record included information that uniquely identified the particular asset 11 being tracked. Such identification information included, for example, data regarding the make, model, year, and serial number of the asset 11, plus any customer-assigned identification number. Second, the record included information that related to the operational characteristics of the particular asset 11 being tracked, such as the physical requirements or limitations of the asset 11 (mast height, load capacity, type of tires for the forklift 11, for example), the type of fuel used, and the period of time or usage between the performance of periodic maintenance. Third, the record included information relating to the acquisition of the asset 11 by the owner or lessee thereof. Such acquisition information included, for example, the type and date of acquisition (purchase or lease, for example), the name of the owner or lessee, the location at which the asset 11 is used, the expected amount of usage of the asset 11 (one, two, or three shifts, for example), and the cost of the acquisition or lease. Furthermore, the record included an area for adding additional information or remarks as desired.

In a second step 22 of the prior art method 20, it was determined whether a maintenance invoice had been received by the person or entity responsible for tracking the assets 11. Typically, a maintenance invoice was a written communication that was generated created by or at the request of the person or entity that owned or operated the assets 11. The maintenance invoice was usually generated upon the occurrence of an event relating to the particular asset 11 and generally contained information regarding the status of one or more operational characteristics of that asset 11. For example, after a particular forklift 11 had been operated by the person or entity that owned or operated the asset 11 for a particular period of time, it would require the performance of some maintenance. This maintenance may, for example, have constituted routine preventative service as a result of the elapse of a predetermined period of time or usage. Alternatively, such maintenance may have constituted non-routine service, such as a repair of a mechanical breakdown. In either event, a maintenance invoice was generated as a result of the performance of that maintenance. The occurrence of other events related to the assets 11 could also result in the generation of maintenance invoices. In man) cases, the maintenance was performed by a maintenance organization having specialized knowledge of asset 11 and its long-term care.

Regardless of the nature of the event that caused them to be generated, the maintenance invoices were generated in hard copy form and contained therein certain information that was desired to be tracked for management purposes, such as the date and nature of the maintenance that was performed, the amount of usage of the asset 11 as of the date of such maintenance, and the cost of such maintenance. To perform the second step 22 of the prior art method 20, the maintenance invoices were required to be physically delivered from the location where the assets 11 were being used or serviced to the location of the analysis controller 13 or to the location of the input device 14 of the analysis controller 13. By physically delivered, it is meant that the maintenance invoice was transmitted in a non-electronic, hard copy form (including, for example, by facsimile) from the person or entity that owned or operated the asset 11 (and who performed, or had performed, the maintenance on the asset 11) to the person or entity responsible for tracking the assets 11.

As shown in FIG. 2, the prior art method 20 continuously repeated step 22 until it was determined that a maintenance invoice had been received by the person or entity responsible for tracking the assets 11. When that occurred, the prior art method branched from the step 22 to a step 23, wherein the record contained in the analysis controller 13 relating to the particular asset 11 was updated with the information contained in the maintenance invoice. This step 23 was accomplished by utilizing the input device 14 to manually enter the information contained in the maintenance invoice into the record relating to the particular asset 11 contained in the analysis controller 13.

Based upon the updated information contained in the record of the asset 11, the analysis controller 13 was programmed to perform a fourth step 24 of the prior art method 20, wherein it was determined whether a sufficient period of time or usage had elapsed as to trigger the performance of periodic routine maintenance for that asset 11. Typically, such determination was made by determining the amount of the elapsed time or usage of the asset 11 (by comparing the most recent indication of the date or amount of usage of the asset 11 with the previous date or amount of usage contained in the record stored in the analysis controller 13), and by comparing such elapsed time or amount of usage with a predetermined standard (also contained in the record of the asset 11 stored in the analysis controller 13). If it was determined that a sufficient amount of elapsed time or amount of usage had occurred, the method 20 branched from the step 24 to a step 25, wherein a hard copy maintenance report was generated by the output device 15. Then, in step 26 of the prior art method 20, the maintenance report generated in the step 25 was physically delivered from the person or entity responsible for tracking the asset 11 to the person or entity that owned or operated the asset 11. The maintenance report advised the person or entity that owned or operated the asset 11 that the time had arrived for the performance of periodic routine maintenance.

Thereafter, the prior art method 20 entered a step 27, wherein it was determined whether a predetermined period of time had elapsed to generate a periodic management report covering some or all of the assets 11 being tracked. Alternatively, if in step 24 of the prior art method 20, it was determined that a sufficient amount elapsed time or amount of usage had not yet occurred, the method 20 branched directly from the step 24 to the step 27. In either event, such management reports were typically generated on a monthly basis. Thus, if the end of the month had occurred, the prior art method 20 branched from the step 27 to a step 28 wherein a hard copy management report was generated by the output device 15. Then, in step 29 of the prior art method 20, the management report generated in the step 28 was physically delivered from the person or entity responsible for tracking the asset 11 to the person or entity that owned or operated the asset 11 The management report advised the person or entity that owned or operated the asset 11 of the status of some or all of the assets 11 that were being tracked, allowing various management oversight and decisions to be made at that time. Thereafter, the prior art method 20 returned from the step 29 to the step 22, wherein it was determined whether a maintenance invoice had been created by or at the request of the person or entity that owns or operates the assets 11 and was physically delivered to the person or entity responsible for tracking the assets 11. Alternatively, if in step 27 of the prior art method 20, it was determined that a predetermined period of time had not yet elapsed to generate a periodic management report covering some or all of the assets 11 being tracked, then the method 20 returned directly from the step 27 to the step 22.

Figure 3:
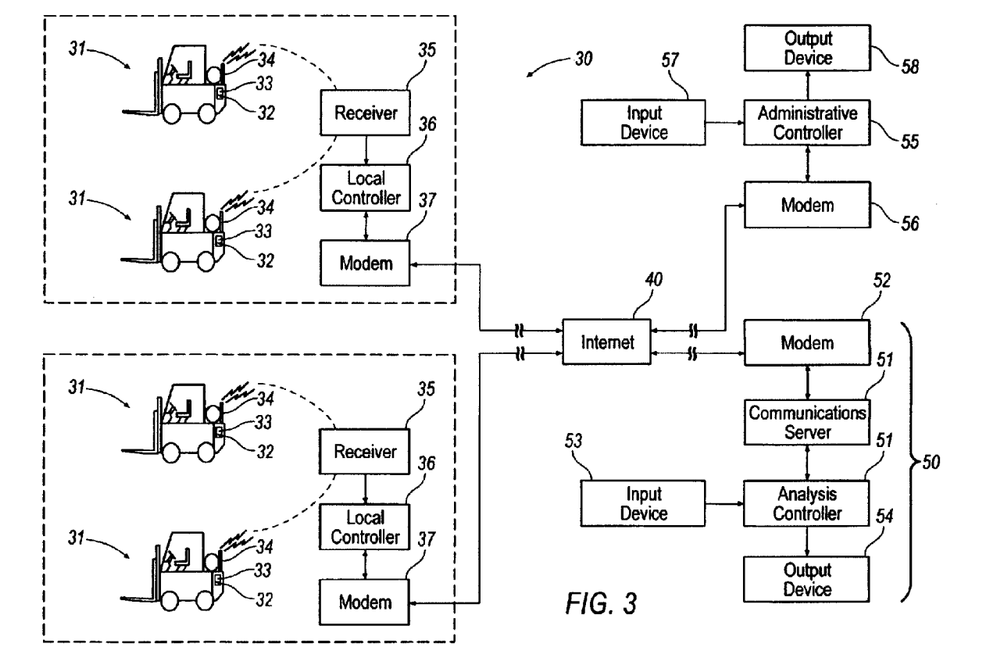
FIG. 3 is a schematic block diagram of a computer-based system for tracking and managing a plurality of assets in accordance with this invention.

Referring now to FIG. 3, there is illustrated schematic block diagram of a computer based system, indicated generally at 30, for tracking and managing a plurality of assets, indicated generally at 31, in accordance with this invention. As with the prior art system 10 described above, the illustrated assets 31 are represented as a plurality of pieces of movable industrial equipment, such as a plurality of conventional forklifts or similar machinery, used in the manufacture of goods in a factory environment. However, the method of this invention can be used to track and manage any type of asset 31, such as those described above, used in the manufacture of goods or the performance of services.

As above, the basic structure and operation of each of the forklifts 31 are well known in the art, and, therefore, require no discussion for a complete understanding of this invention. However, unlike the forklifts 11 of the prior art system 10, a data acquisition device 32 is provided on each of the forklifts 31 for sensing and storing one or more operating characteristics of the associated forklift 31. The basic structure and operation of each of the data acquisition devices 32 are conventional in the art. For example, each of the data acquisition devices 31 may be embodied as an electronic processor or controller that can sense or be otherwise responsive to one or more operating conditions of the associated forklift 31. Each of the data acquisition devices 31 can be responsive to any desired operating conditions of the forklift 31 that might be considered important in making effective management decisions regarding the operation of the forklift 31. Such desired operating conditions can, for example, include the time duration of use (and non-use), distances traveled, the extent of fork usage, the nature of hydraulic system utilization, and the like. More typically for industrial assets, the most importance criteria is time duration of use. The sensed operating conditions of the forklifts 31 are preferably stored at least temporarily in a memory of the data acquisition device 32 for subsequent communication to a remote analysis system, indicated generally at 50, for analysis in the manner described in detail below. Thus, the data acquisition devices 32 sense and store the desired operating conditions for each of the forklifts 31 during use.

Each of the forklifts 31 is further provided with a transmitter 33 or other communications system for transmitting the acquired data from the data acquisition device 32 to the remote analysis system 50 for analysis. Each of the transmitters 33 may be embodied as any conventional device for transmitting the acquired data to the remote analysis system 50, such as a hard-wired communications interface. However, as is well known, each of the forklifts 31 is a movable vehicle that is capable of traveling extensively throughout the particular environment in which it is used. To facilitate the transmission of the acquired data, therefore, the transmitter 33 is preferably embodied as a wireless communications system, such as represented by an antenna 34. The transmitters 33 and the wireless communications systems 34 can be embodied as conventional radio frequency transmitters provided on each of the forklifts 31 that transmit electromagnetic signals. However, other well known forms of wireless communication, such as those utilizing light or sound, may be used in lieu of a radio frequency transmitter.

The wireless communications systems 34 are adapted to transmit signals that are representative of the sensed operating conditions of the forklifts 31 through space to a receiver 35. In contrast to the forklifts 31 that can travel extensively throughout the environment in which they are operated, the receiver 35 is preferably provided at a fixed location within that environment. If desired, a plurality of such receivers 35 may be provided at different locations within the environment in which the forklifts 31 are operated. As the forklifts 31 move about the environment during use, they will occasionally pass by or near the receiver 35. When this occurs, the receiver 35 receives the data transmitted from the respective data acquisition units 32. The receiver 35 is also conventional in the art.

Preferably, the data acquisition units 32 and the receivers 35 are in bi-directional communication with one another. One advantage of such bi-directional communication is that the data acquisition unit 32 can send out a query signal on a predetermined basis to be received by the receiver 35 when the two units 32 and 35 are sufficiently close to communicate reliably with one another. Thus, when the data acquisition unit 32 contacts the receiver 35, the receiver 35 can send a first signal back to the data acquisition unit 32 to instruct it to begin transmitting the acquired data. At the completion of the data transfer, the receiver 35 can send a second signal back to the data acquisition unit 32 to acknowledge the receipt of the transmitted data. A conventional error checking algorithm can be used to confirm the accuracy and completeness of the transmitted data and, if necessary, request a re-transmission thereof.

Another advantage of such bi-directional communication is that data in the form of new commands, program updates, instructions, and the like can be sent to the data acquisition units 32 from the receiver 35. In some instances, such as when a data acquisition unit 32 is in generally continuous communication with a receiver 35, a user of the forklift 31 can be prompted to provide certain information for transmission to the receiver 35 for further analysis.

The receiver 35 is connected to a local controller 36. The local controller 36 is also, of itself, conventional in the art and may be embodied as an electronic controller that is adapted to receive and store at least temporarily the data from each of the receivers 35. Alternatively, if the assets 31 are fixed in position, such as in the case of a plurality of stationary machines used in a manufacturing environment, the receiver 35 or receivers 35 may be provided on movable structures that move about the environment to receive the information transmitted therefrom. In either event, it is desirable that the local controller 36 acknowledge receipt of the information transmitted from the data acquisition devices 32, allowing the data acquisition devices 32 to delete the transmitted information and begin storing newly acquired information. A combined system including the data acquisition device 32, the transmitter 33, the wireless communications system 34, the receiver 35, and software for operating the local controller 36 to gather and report data is commercially available, such as from I.D. Systems, Inc. of New York, N.Y. or Requip (formerly SXI).

In a preferred embodiment, the various elements located in an asset 31 are hardwired into the electrical system of the asset to minimize the possibility of undesirable failure or tampering.

Thus, after the forklifts 31 have been operated for a period of time, the local controller 36 will have gathered and stored therein a certain amount of information regarding the individual operating characteristics for each of the forklifts 31. The local controller 36 is programmed to periodically transmit the information stored therein to the remote analysis system 50 for analysis. This can be accomplished by providing the local controller 36 with a conventional modem 37 or other communications device that can convert the stored information into a format that is compatible for transmission through an electronic communications network, such as the internet 40. As is well known, the Internet 40 is a digital electronic communications network that connects computer networks and organizational computer facilities around the world. Access to the Internet 40 can be easily obtained in most locations through the local telephone lines or by similar means.

The system 30 of this invention may be used to track and manage a plurality of assets 31 located at any desired physical location. Additionally, the system 30 of this invention may be used to track and manage assets 31 located at a plurality of different physical locations, as suggested by the dotted lines in FIG. 3. Each different physical location can be provided with one or more receiver 35, a local controller 36, and a modem 37 to connect the system 30 to the Internet 40.

As mentioned above, the sensed operating conditions of the forklifts 31 are intended to be transmitted to the remote analysis system 50 for analysis. Referring again to FIG. 3, it can be seen that the remote analysis system 50 includes an analysis controller 51 that is connected to communicate through the internet 40 by means of a modem 52 or similar communications device. If desired, a communications server 51a may be connected between the analysis controller 51 and the modem 52. The communications server 51a is provided to selectively receive and organize the information from each of the local controllers 36 for delivery to the analysis controller 51. The analysis controller 51 can be embodied as any conventional electronic controller that is capable of receiving the sensed operating conditions of the forklifts 31 and for processing that information in a desired manner described in detail below. Ideally, the sensed operating conditions of the forklifts 31 are used to automatically generate and analyze management reports relating to the procurement and utilization of a plurality of the forklifts 31 to maximize productivity and to reduce operating costs and administrative burdens. An input device 53 and an output device 54, both of which are conventional in the art, may be connected to the analysis controller 51.

As also shown in FIG. 3, one or more administrative controllers 55 (only one is illustrated) can be connected to the internet 40 through respective modems 56 or similar communications devices. Each of the administrative controllers 55 can also be embodied as any conventional electronic controller that can request and receive information from the remote analysis system 50 through the Internet 40. In a manner that is described in detail below, the administrative controllers 55 are provided to request and receive the management information generated by the remote analysis system 50. If desired, the local controller 36 can also function as an administrative controller 55, although such is not necessary. An input device 57 and an output device 58, both of which are conventional in the art, may be connected to the administrative controller 55.

Figure 4A:
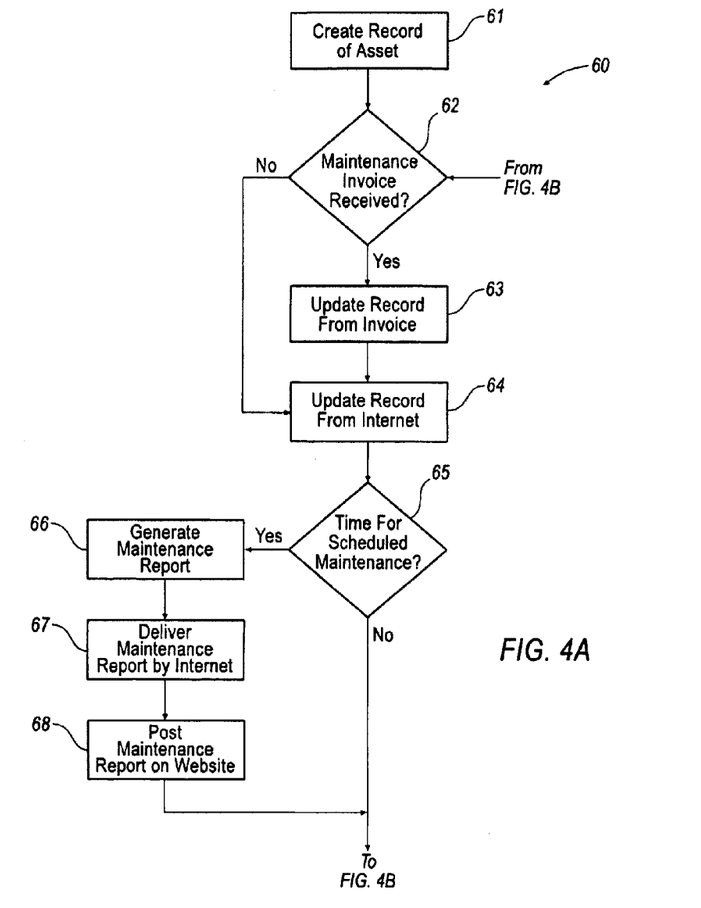
FIGS. 4A through 4C are three portions, respectively, of a flow chart of a method for tracking and managing assets in accordance with the computer based system illustrated in FIG. 3.
Figure 4B:
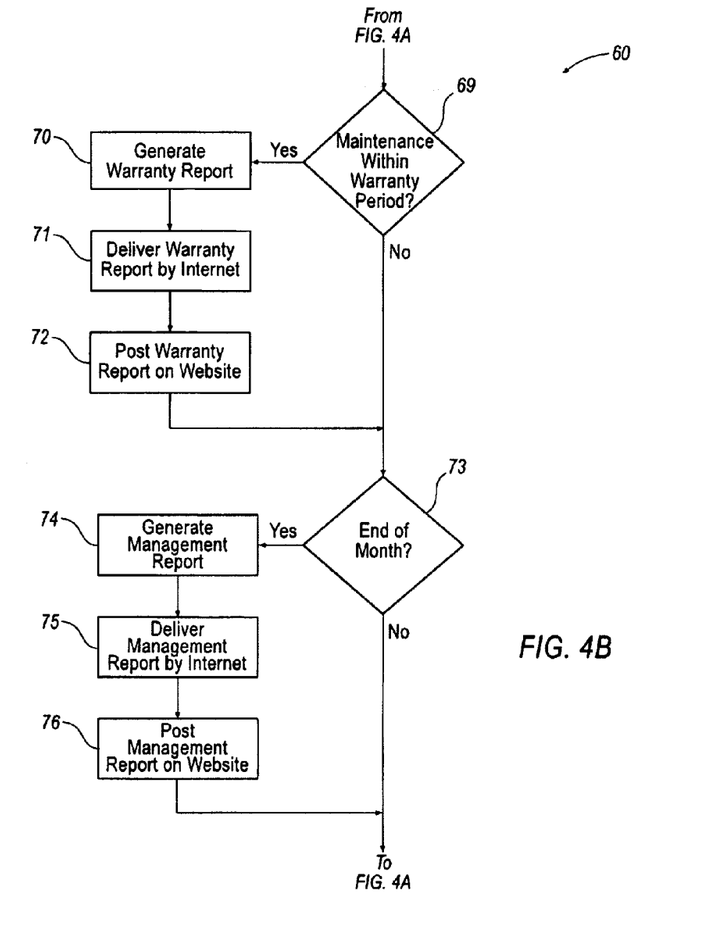
Figure 4C:
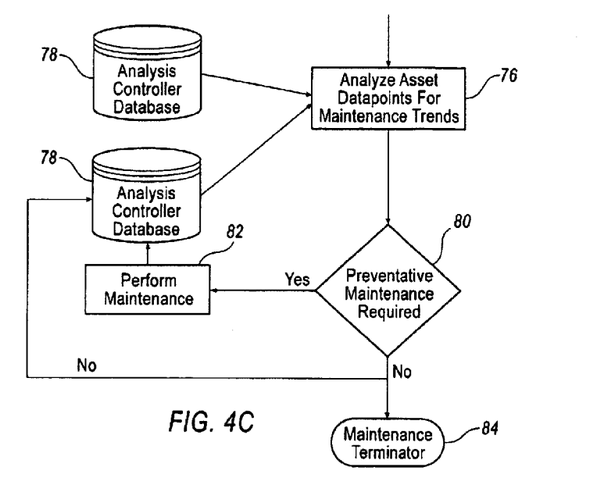

Referring now to FIGS. 4A through 4C, there is illustrated a flow chart, indicated generally at 60, of a method for tracking and managing the assets 31 in accordance with this invention using the computer based system 30 illustrated in FIG. 3. Throughout this discussion also, reference will be made to a first person or entity that owns or operates the assets 31 that are being tracked and to a second person or entity that is responsible for tracking information relating to such assets 31. As above, it will be appreciated that a single person or entity may not only own and operate the assets 31, but also track the information relating thereto.

In an initial step 61 of the method 60, a record is created for each individual asset 31 by the person or entity responsible for tracking such assets, such as one of the forklifts 31 illustrated in FIG. 3. The record can be created electronically within the analysis controller 51 by means of the input device 53 and can include a variety of information that is desired to be tracked for management purposes, including all of the information described above in connection with the forklifts 11 and the analysis controller 13. Additionally, the record can further include information regarding the nature and time duration of a warranty provided by the manufacturer or supplier of the assets 31. Such warranty information can be used in the manner described in further detail below to automatically determine whether the responsibility for the maintenance being performed on the asset 31, either in whole or in part, should rest with the manufacturer or the supplier of the asset 31 or with the owner or user of the asset 31.

In a second step 62 of the method 60, it is determined whether a maintenance invoice has been received by the person or entity responsible for tracking the assets 31. Such maintenance invoices can be generated and delivered in the same manner as described above. If it is determined that a maintenance invoice has been received by the person or entity responsible for tracking the assets 31, the method branches from the step 62 to a step 63, wherein the record contained in the analysis controller 51 relating to the particular asset 31 is updated with the information contained in the maintenance invoice in the same manner as described above. Next, the method enters a step 64 wherein the record contained in the analysis controller 51 relating to the particular asset 31 is updated with information from the internet 40. Alternatively, if it is determined that a maintenance invoice has not been received by the person or entity responsible for tracking the assets 31, the method branches directly from the step 62 to the step 64.

As discussed above, the local controller 36 will have gathered and stored therein a certain amount of information regarding the individual operating characteristics for each of the forklifts 31. The local controller 37 is programmed to periodically transmit the information stored therein to the remote analysis system 50 for analysis. The analysis controller 51 can include a memory circuit for storing this information from the local controller 36. The transmission of the information from the local controller 36 to the analysis controller 51 can be performed in real time, upon occurrence of predetermined events (such as the gathering of a predetermined amount of information), or at predetermined time intervals. In any event, the record contained in the analysis controller 51 is automatically updated with the latest information regarding the status of the asset 31, without any human intervention.

Based upon the updated information contained in the record of the asset 31, the analysis controller 51 next determines whether a sufficient period of time or usage has elapsed as to trigger the performance of periodic routine maintenance for that asset 31. This determination can be made in the same manner as described above in connection with 24 of the prior art method 20. If it is determined that a sufficient amount elapsed time or amount of usage had occurred, the method 60 branches from the step 65 to a step 66, wherein an electronic maintenance report is generated. If desired, a hard copy of the maintenance report can also be generated by an output device 54 connected to the analysis controller 51. Then, in step 67 of the method 60, the electronic maintenance report generated in the step 66 is delivered from the person or entity responsible for tracking the asset 31 to the person or entity that owns or operates the asset 31 through the Internet 40. As above, the maintenance report can advise the person or entity that owns or operates the asset 31 that the time had arrived for the performance of periodic routine maintenance. Alternatively, the maintenance report 55 can be delivered to a specialized maintenance organization responsible for maintenance of the assets 31. The electronic maintenance report can, for example, be delivered through the Internet 40 to one or more of the administrative controllers 55 as desired. Alternatively, or additionally, the electronic maintenance report can be delivered through the Internet 40 to one or more of the local controllers 36. Also, in step 68 of the method 60, the electronic maintenance report generated in the step 66 is posted on a website maintained on the Internet 40. The website may be maintained either by the person or entity responsible for tracking the asset 31 or by the person or entity that owns or operates the asset 31 through the Internet 40. As opposed to the direct electronic delivery of the maintenance report to a particular person or group of persons contemplated in the step 67, the step 68 contemplates that the maintenance report is made available to such person or group of persons at their request over the Internet 40.

Thereafter, the method 60 enters a step 69, wherein it is determined whether any maintenance that has been performed on the asset 31 occurred within the warranty period provided by the manufacturer or supplier. Alternatively, if in the step 65 of the method 60, it was determined that a sufficient amount elapsed time or amount of usage had not yet occurred, the method 60 branches directly from the step 65 to the step 69. In either event, this determination can be made by comparing the date of service or amount of usage of the asset 31 with the warranty information contained in the record for that asset 31 contained in the analysis controller 51. If it is determined that service on the asset 31 occurred within the warranty period, the method 60 branches from the step 69 to a step 70, wherein an electronic warranty report is generated. If desired, a hard copy of the warranty report can also be generated by the output device 54 connected to the analysis controller 51. Then, in step 71 of the method 60, the electronic warranty report generated in the step 70 is delivered from the person or entity responsible for tracking the asset 31 to the person or entity that owns or operates the asset 31 through the Internet 40. As above, the warranty report can advise the person or entity that owns or operates the asset 31 that the service performed on the asset 31 should be paid for by the manufacturer or supplier of the asset 31. The electronic warranty report can, for example, be delivered through the Internet 40 to one or more of the administrative controllers 55 as desired. Alternatively, or additionally, the electronic warranty report can be delivered through the Internet 40 to one or more of the local controllers 36. Also, in step 72 of the method 60, the electronic warranty report generated in the step 70 is posted on a website maintained on the Internet 40. The website may be maintained either by the person or entity responsible for tracking the asset 31 or by the person or entity that owns or operates the asset 31 through the Internet 40. As opposed to the direct electronic delivery of the warranty report to a particular person or group of persons contemplated in the step 71, the step 72 contemplates that the warranty report is made available to such person or group of persons at their request over the Internet 40.

Thereafter, the method 60 enters a step 73, wherein it is determined whether a predetermined period of time has elapsed to generate a periodic management report covering some or all of the assets 31 being tracked. Alternatively, if in step 69 of the method 60, it was determined that a sufficient amount elapsed time or amount of usage had not yet occurred, the method 60 branches directly from the step 69 to the step 73. In either event, such management reports are typically generated on a monthly basis. Thus, if the end of the month has occurred, the method 60 branches from the step 73 to a step 74, wherein an electronic management report is generated. If desired, a hard copy of the management report can also be generated by the output device 54 connected to the analysis controller 51. Then, in step 75 of the method 60, the electronic management report generated in the step 74 is delivered from the person or entity responsible for tracking the asset 31 to the person or entity that owns or operates the asset 31 through the Internet 40. As above, the management report can advise the person or entity that owns or operates the asset 31 of the same information as the management reports discussed above. The electronic management report can, for example, be delivered through the Internet 40 to one or more of the administrative controllers 55 as desired. Alternatively, or additionally, the electronic management report can be delivered through the Internet 40 to one or more of the local controllers 36. Also, in step 76 of the method 60, the electronic warranty report generated in the step 74 is posted on a website maintained on the Internet 40. The website may be maintained either by the person or entity responsible for tracking the asset 31 or by the person or entity that owns or operates the asset 31 through the Internet 40. As opposed to the direct electronic delivery of the management report to a particular person or group of persons contemplated in the step 75, the step 76 contemplates that the management report is made available to such person or group of persons at their request over the Internet.

FIG. 4C demonstrates an additional functional aspect of method 60 using the inventive system. In addition to determining whether a maintenance invoice has been received, if scheduled maintenance has been performed, and determining the party responsibility for certain maintenance activities, it is possible to poll asset data points at point 76 from an analysis controller database 78 associated with one or more discrete analysis controllers 51 that may be associated with one or more businesses. A plurality of databases 78 are shown. When a maintenance organization has access to various asset fleets of the same type or make of equipment, it may be beneficial to analyze the relevant information using a larger available knowledgebase of information to analyze appropriate trends. By analyzing the data points, certain maintenance trends can be analyzed and problems can be anticipated before they affect asset utilization. For example, if it turns out that asset 31 has a tendency to need new batteries after a certain period of usage; the need for such batteries can be anticipated and stocked on site when appropriate to facilitate maintenance. As shown in FIG. 4C, once the various trends have been analyzed for assets 31, at decision point 80 it is determined whether preventative maintenance is required. If it is required, the maintenance is performed as shown at point 82 and the information is stored in database 78. The asset data points are then analyzed again until it is determined that no further preventative maintenance is required. Then the system terminates at point 84. Thus, FIGS. 4A through 4C illustrate the use of critical information from assets 31 to perform maintenance and to provide a methodology for providing access to information by various third parties.

Figure 5:
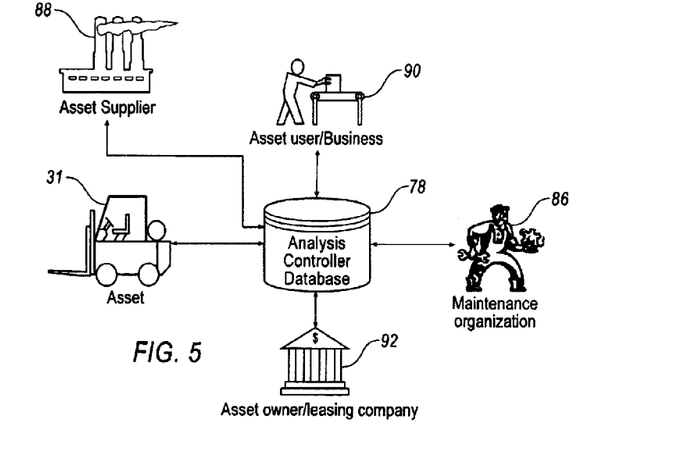
FIG. 5 illustrates the relationship of various parties to a database associated with an analysis controller.

FIG. 5 illustrates the beneficial interrelationships that promote efficiency by having various parties associated in some way with an asset 31 in one or two-way communication with analysis controller 51 either by way of administrative controller 55, reports 71 or 75, web site postings electronic mail, or the like. As already discussed above, asset 31 provides usage and performance data that is stored in the asset controller 51 according to certain predetermined criteria important for that asset. As also discussed above, a maintenance organization 86 both receives and provides information to database 78. While business 90 may provide its own maintenance of assets 90, for the discussion a separate maintenance organization is illustrated.

Warranty information as shown by steps 70 through 72 of FIG. 4B is of particular interest to the asset manufacturer or supplier 88. While it may not be appropriate for a supplier 88 to be able to alter information in database 78, the ability to quickly and accurately collect information concerning warranty obligations and the like is of particular benefit to all of the parties. For example, warranty issues may be caught more quickly, ultimately reducing asset cost and operation while simultaneously promoting asset up time. The ability of the asset user 90 to analyze and administer assets 31 has also been discussed in detail. However, key advantages also result by allowing the owner of asset 31 to analyze key data associated with asset 31. In the illustrated embodiment, it is assumed that the owner of the asset 31 is a separate asset owner 92 such as a leasing company, as opposed to business 90 itself, although this is not required.

Figure 6:
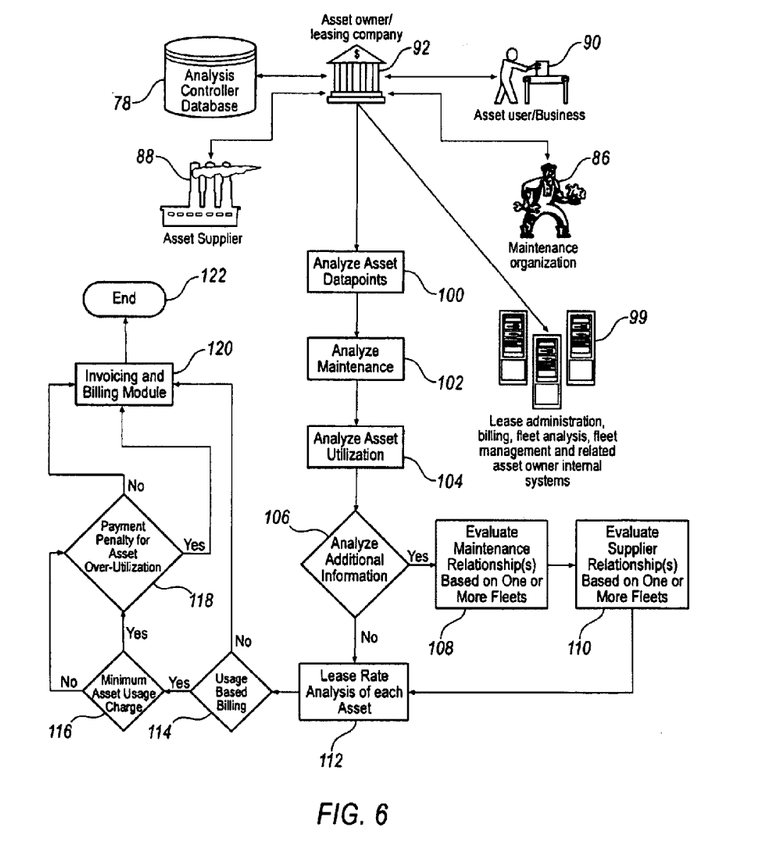
FIG. 6 is a flow chart of a sub-system illustrating the analysis of asset-related information to determine responsibility for asset utilization, and developing a lease relationship between an asset owner and an asset user based on asset utilization criteria.

The advantages of an asset owner 92 having at least one and possibly two-way access to the real-time and historical information stored in analysis controller database 78 as well as the ability to communicate with supplier 88, maintenance 86, and business 90, is illustrated in sub-system 98 illustrated in FIG. 6. Sub-system 98 is activated by the asset owner 92 using data from database 78, but typically utilizing its own lease administration and billing systems. In many cases it is also using its own fleet analysis and management systems, which are typically aggregating information from a number of different fleets associated with a plurality of businesses 90. These various systems, one or more of which may be used independently or in concert, are collectively shown at point 99. As noted above, web-site access, generated reports, analysis controllers 51, and administrative controllers 55 provide exemplary access points for pulling asset information from system 30.

An asset owner 92 and an asset user such as business 90 share the common interest in maximizing efficiency by taking into account such variables as asset usage and asset costs. The more information that is available, the more likely that efficiency is maximized. In traditional leasing relationships involving non-fixed or movable assets such as forklifts where minimal asset utilization information is available, the burden of determining the point of maximum efficiency typically rests with business 90, since it has control over the asset. Therefore, a leasing company 92 typically enters into a lease arrangement where a fixed lease amount is paid in periodic payments by business 90 over the life of the lease. At best, only minor flexibilities are provided. When leasing company 92 regains control of an asset 31 at the end of the lease term, there is uncertainty concerning the condition of the asset. This uncertainty also typically rests with business 90 in the form of a financial cushion incorporated into the leasing relationship.

However, such uncertainty is minimized in the present invention. As shown at point 100, asset owner 92 is able to analyze the various desired objectively generated asset data points associated with an asset 31. As noted above, these data points can include the time of asset usage within a fixed time period, distance traveled, and certain performance parameters associated with the particular asset (e.g., hydraulic system usage or fork usage for fork lifts). As noted above, in practice, for industrial assets the time of use is the most important single data point. Then, as shown at point 102, asset owner 92 may analyze maintenance considerations. For example, a major routine overhaul as compared to a system failure can be analyzed. Then at point 104, the asset owner 92 can compare the raw data from the asset with maintenance conducted during the same time period. By comparing the raw data with maintenance considerations, the owner is able to analyze the asset utilization under the control of business 90 if maintenance organization 86 and supplier 88 are different third parties. For example, the asset owner 92 can determine that an asset 31 has been used very little during the time period, even allowing for maintenance. Alternatively, the owner may determine that the asset is being used continuously when not undergoing maintenance, possibly suggesting that additional assets may be appropriate to reduce overall maintenance stress on the pre-existing asset.

Additional information can be analyzed by the asset owner as shown at decision point 106. Typically, the information includes data associated with other parties having access to database 78. As shown at point 108, for example, the asset owner 92 can evaluate the maintenance relationship with maintenance organization 86. If the relationship has been very positive, an appropriate incentive may be provided to the organization in the form of shared cost savings. Alternatively, if the relationship has been negative, an appropriate penalty may also be implemented. The same considerations are available if business 90 acts as its own maintenance organization 86.

Similarly, the asset owner 92 may evaluate its relationship with the asset supplier 88 as shown at point 110. The information may affect asset payments from the owner to the supplier or the future relationship of the parties.

These various advantages are applicable even if asset owner 92 and business 90 are the same entity. However, more typically with industrial equipment, asset owner 92 is different than asset user 90, where the two parties have entered into a lessor/lessee relationship. In such a case, the information in database 78 may be used to mutually maximize the relationship between the asset owner 92 and the business 90. With appropriate safeguards asset owner 92 may be willing to share in a greater portion of the risk associated with the utilization of asset 31 in determining a lease rate based on an analysis of each user fleet or individual asset as shown at point 112. Most significantly, rather than entering into a traditional fixed lease amount as noted above, asset owner 92 may be willing to enter into a hybrid lease arrangement wherein the lease charge may be a combination of one or more of the following elements: 1) a minimum payment that has to be made if asset utilization is below a pre-determined minimum threshold; 2) a usage based-payment that is made if usage is above the pre-determined minimum threshold and below a pre-determined maximum threshold; 3) a penalty payment or surcharge is made if utilization is higher than the pre-determined maximum threshold; and 4) payments/rewards based on incentive issues such as asset re-allocation or timely maintenance.

The decision of whether to use usage-based billing based on one or more objective criteria based on an analysis of asset utilization is shown at decision point 114. The decisions to charge either a minimum payment if a certain usage level is not met, or to charge a usage penalty above a maximum appropriate usage level, are shown by decision points 116 and 118 respectively. Thus, a variable-amount lease may be developed based on an analysis of objective criteria that is based in large part on the actual portion of an asset's life that is consumed by the asset user (e.g., usage hours). In a preferred embodiment, the analysis is based on a pre-determined usage/pricing matrix in combination with actual usage for a specified time period. Once a level of maximum efficiency has developed, leasing will typically be primarily, if not solely, based on asset usage billing.

Through the use of the innovative leasing arrangement based on improved information availability to asset owner 92, the expenses of an asset user such as business 90 can be more accurately aligned with usage and asset value consumption. More operational flexibility is provided to business 90. When leasing is based predominantly on asset usage billing, a business 90 is able to adopt true off-balance sheet financing (i.e., the business is not required to note a financial obligation even in the footnotes of various financial reports as opposed to standard off-balance sheet leasing where a company must disclose the lease in footnotes even if the lease does not show up on the balance sheet). At the same time, asset owner 92, can collect information from a variety of sources to maximize its relationships with its own vendors and customers to the benefit of all related parties by minimizing inefficiencies and providing appropriate accountability with maximum accuracy and validity tied to a minimal likelihood for mistakes, misinformation, or even fraud.

These various factors can be adjusted dynamically by the asset owner 92 as a knowledge base is collected within its internal systems 99 and based on the actions of the other related parties. For a sophisticated asset owner with numerous fleets, it can conduct appropriate analyses over all of its fleets to determine certain trends, which it may advantageously use.

For example, if supplier 88 or maintenance organization 86 is responsible for abnormally low asset utilization as opposed to actions within the control of business 90, then the risk associated with these possibilities can be shared between asset owner 92 and various affected businesses 90 and transferred in some fashion to the responsible party. Thus, in a more preferred embodiment of the invention, asset usage is adjusted for maintenance considerations if business 90 is not responsible for its own maintenance.

As shown at point 120, once the readily available information is analyzed in view of the business relationship between an asset owner 92 and a business 90, an invoice and billing module associated with the asset owner's own internal systems 99 is invoked that generates an appropriate invoice that is sent by the asset owner to the business for payment and sub-system 98 terminates at point 122. In a preferred embodiment, once sub-system 98 is developed for a particular situation, and in the absence of an extraordinary event, invoicing is automated based strictly on the objective criteria developed with minimal outside involvement.

A key advantage of the present invention is that real-time data is collected by data acquisition device 34 and timely transmitted to local controller 36 for transmission to database 78 of analysis controller 51. If incomplete or limited data representing only a small portion of the appropriate asset data points are transmitted, then appropriate decisions cannot be made to maximize asset utilization. For example, in the case of forklifts, both time of usage and distance traveled help provide information concerning asset utilization and maintenance considerations.

Thus, the computer based system 30, including subsystem 98, of the present invention provides a superior method for tracking and managing the assets 31 than the prior art system 10. First, by providing the assets with the data acquisition devices 32 and the communications system 33 and 34, the operational characteristics and other information regarding the assets 31 is automatically sensed and transmitted to the analysis controller 51 on a real time basis, without requiring human intervention or assistance. Second, the analysis controller 51 is programmed to analyze such information as it is received and to automatically generate maintenance and warranty reports in response thereto. Third, all of the reports generated by the analysis controller 51 are automatically delivered to the appropriate persons through the Internet 40, either directly to one or more of the administrative controllers 55 or by posting on a web site, electronic mail or similar mechanisms. Fourth, as shown by sub-system 98, the information can be used to maximize asset usage efficiency. As a result, the computer based system 30 facilitates the gathering, analyzing, and delivering of information relating to the procurement and utilization of the assets 31 so as to maximize productivity and to reduce operating costs and administrative burdens to the benefit of all parties having a relationship with the asset and an interest in its performance.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for gathering and analyzing data relating to a non-fixed movable asset comprising:
   a local controller located at a first location for acquiring data that is representative of at least one operating characteristic of the asset;
   an analysis controller located at a second location that is responsive to said acquired data from said local controller for generating an analysis of said acquired data; and
   an electronic communications network connected between said local controller and said analysis controller and permitting transmission of said acquired data from said local controller to said analysis controller; and
   a sub-system that analyzes said at least one operating characteristic of the asset to determine a lease rate for the asset, the lease rate being a variable.

2. A system as recited in claim 1, wherein said lease rate includes a minimum charge if said operating characteristic is below a pre-determined threshold.

3. A system as recited in claim 1, wherein said lease rate includes a surcharge if said operating characteristic is above a pre-determined threshold.

4. A system as recited in claim 1, wherein said lease rate includes a minimum charge if said operating characteristic is below a pre-determined threshold and a surcharge if said operating characteristic is above a pre-determined threshold.

5. A system as recited in claim 1, wherein there are a plurality of operating characteristics used to determine said lease rate.

6. A system as recited in claim 5, wherein said plurality of operating characteristics includes time of operation within a fixed period of time.

7. A system as recited in claim 1, said analysis controller receiving maintenance information affecting said operating characteristic, said maintenance information affecting said lease rate.

8. A system as recited in claim 1, said analysis controller receiving maintenance information affecting said operating characteristic, wherein a first party represents an asset user and a second party represents at least one of an asset supplier and a maintenance organization, and further comprising an asset owner, wherein said asset owner analyzes said maintenance information for a plurality of assets associated with at least one of said asset supplier and said maintenance organization to evaluate its relationship based on overall maintenance performance.

9. A system as recited in claim 1, wherein said asset is limited to motion in a pre-determined geographic region to ensure the acquisition of the data.

10. A method for gathering and analyzing data relating to an asset comprising the steps of:
    activating a local controller located at a first location;
    acquiring data that is representative of at least one operating characteristic of the asset which is communicated from the asset to said local controller;
    transmitting said operating characteristic at pre-determined intervals from said local controller to an analysis controller located at a second location using an electronic communications network connected between said local controller and said analysis controller; and
    a sub-system receiving data from said analysis controller and using said data, including said at least one operating characteristic of the asset, and
    determining a lease rate for the asset based in part on said at least one operating characteristic of the asset.

11. A method as recited in claim 10, said at least one operating characteristic representing an objective criteria, said determining step comprising the sub-steps of measuring said criteria and generating a usage-based analysis of asset utilization.

12. A method as recited in claim 11, said determining step comprising the sub-step of charging a minimum lease rate when said asset utilization is below a pre-determined threshold.

13. A method as recited in claim 11, said determining, step comprising the sub-step of charging a surcharge when said asset utilization exceeds a pre-determined threshold.

14. A method as recited in claim 11, said determining step comprising the sub-steps of charging a minimum lease rate when said asset utilization is below a first pre-determined threshold and charging a surcharge when said asset utilization exceeds a second predetermined threshold.

15. A system for gathering and analyzing data relating to a non-fixed movable asset limited to motion in a predetermined geographic region to ensure the acquisition of said data comprising:
- a local controller located at a first location for acquiring data that is representative of at least one operating characteristic of the asset;
- an analysis controller located at a second location that is responsive to said acquired data from said local controller for generating an analysis of said acquired data, said analysis controller receiving maintenance information affecting said operating characteristic; and
- an electronic communications network connected between said local controller and said analysis controller and permitting transmission of said acquired data from said local controller to said analysis controller; and
- a sub-system that analyzes said at least one operating characteristic of the asset to determine a lease rate for the asset, an asset owner establishing said lease rate and analyzing said maintenance information as a factor in setting said lease rate.

16. A system as recited in claim 15, wherein said lease rate includes a minimum charge if said operating characteristic is below a pre-determined threshold or a surcharge if said operating characteristic is above a pre-determined threshold.

17. A system as recited in claim 15, wherein a first party comprises an asset owner and a second party represents at least one of an asset supplier and a maintenance organization, and wherein said asset owner analyzes said maintenance information for a plurality of assets associated with at least one of said asset supplier and said maintenance organization to evaluate its relationship based on overall maintenance performance.

18. A system as recited in claim 1, wherein said lease rate is lower if timely maintenance is performed and said lease rate is higher if said maintenance is untimely.

19. A system as recited in claim 1, wherein said lease rate is based on a hybrid lease arrangement comprising the following elements:
- a minimum payment that has to be made if measurement of said operating characteristic is below a pre-determined minimum threshold;
- a usage based-payment if measurement of said operating characteristic is above said pre-determined minimum threshold and below a pre-determined maximum threshold;
- a penalty payment or surcharge if measurement of said operating characteristic is higher than said pre-determined maximum threshold.

20. A system as recited in claim 19, wherein said operating characteristic is utilization.

21. A system as recited in claim 19, comprising the further element of adjusting said lease rate based on a determination of asset maintenance timeliness.

* * * * *